United States Patent [19]

Labelle

[11] 4,084,784
[45] Apr. 18, 1978

[54] SLIDE GATE SEALING CLOSURE

[75] Inventor: Camille A. Labelle, Greenfield Park, Canada

[73] Assignee: Armco Steel Corporation, Middletown, Ohio

[21] Appl. No.: 762,979

[22] Filed: Jan. 27, 1977

[30] Foreign Application Priority Data

Feb. 16, 1976 Canada .................................. 245778

[51] Int. Cl.² ............................................ F16K 51/00
[52] U.S. Cl. ..................................... 251/147; 251/328
[58] Field of Search ..................... 251/147, 328; 61/28

[56] References Cited

U.S. PATENT DOCUMENTS

| 966,154 | 8/1910 | Ashley | 251/147 X |
| 1,054,150 | 2/1913 | Thorsby | 251/328 X |
| 1,594,204 | 7/1926 | Kingham | 251/147 |
| 1,704,955 | 3/1929 | Snow | 251/328 |

Primary Examiner—Harold W. Weakley

Attorney, Agent, or Firm—Melville, Strasser, Foster & Hoffman

[57] ABSTRACT

A gate assembly has a frame with a sill and an opening for the passage of a fluid, and a gate slide mounted on said frame for movement toward and away from said sill, between open and closed positions. The improvement, in combination therewith, comprises a first flange projecting from the frame on both sides of the opening, a resilient sealing member fixed to the first flange, and a second flange substantially identical to the first flange projecting from the back side of the gate slide. The first and second flanges are so positioned that, when the gate slide is in the closed position against the sill, the first and second flanges overlap and the resilient sealing member is compressed so as to produce a water tight seal. Sealing is accomplished by a compression of the resilient sealing member between the first and second flanges when the gate slide is substantially closed, thus virtually eliminating frictional wear of the resilient sealing member the first and second flanges are inclined, resulting in engagement and compression of the resilient sealing member as the gate slide approaches its closed position.

9 Claims, 9 Drawing Figures

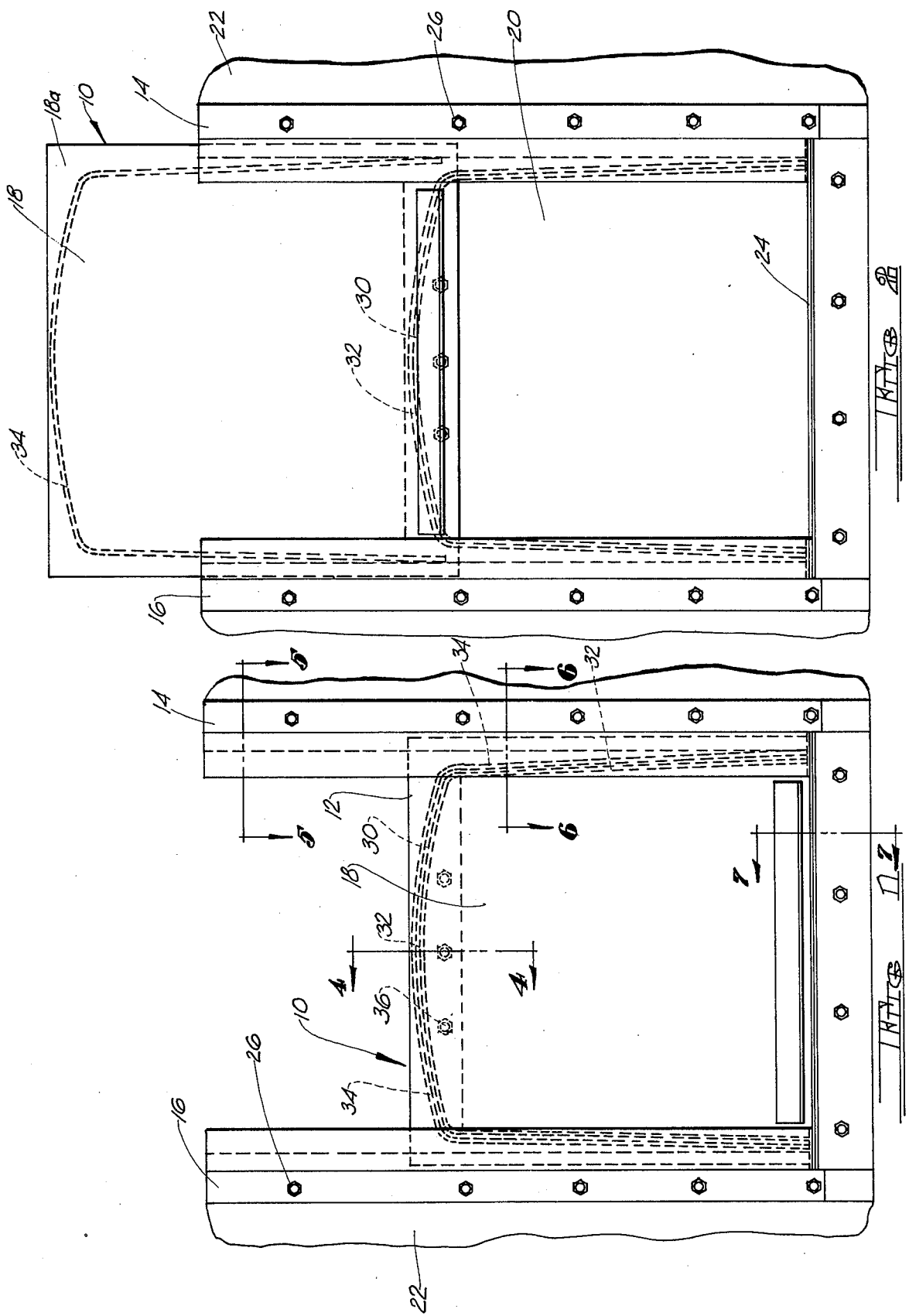

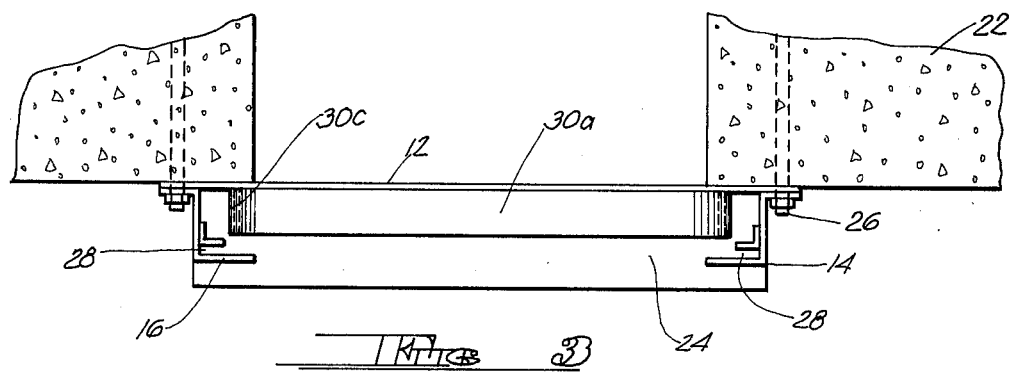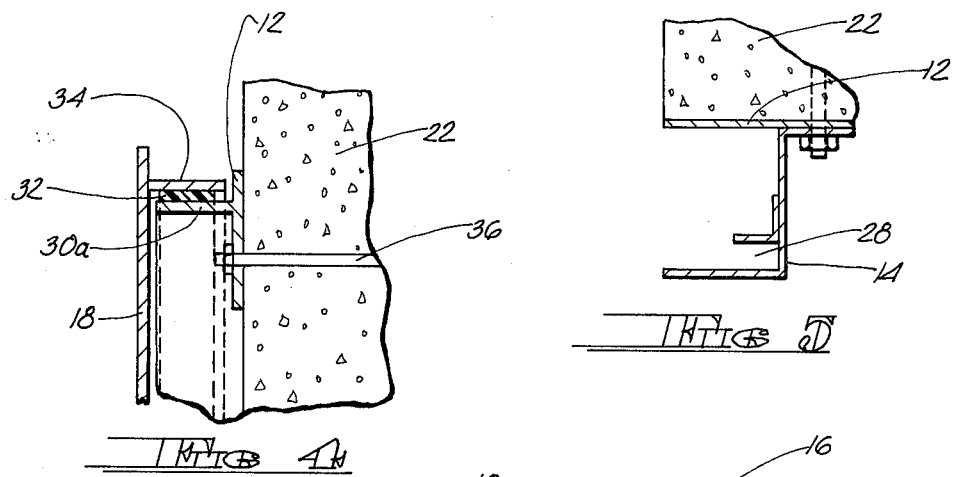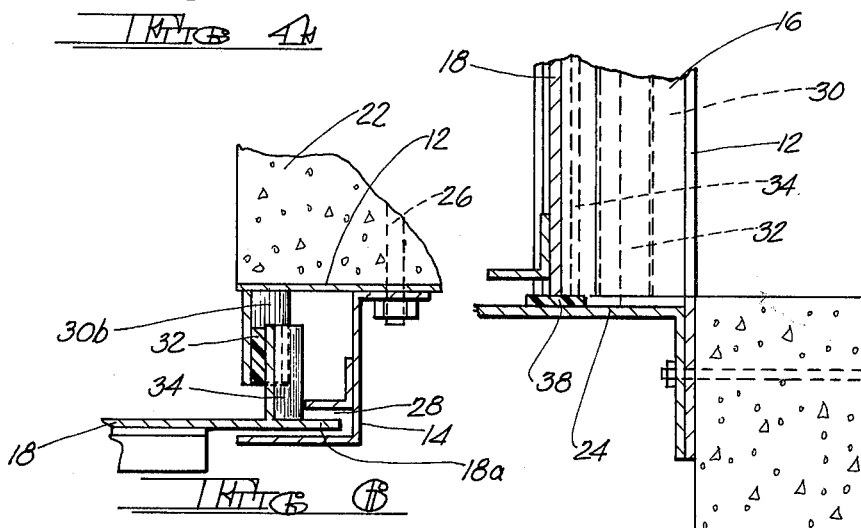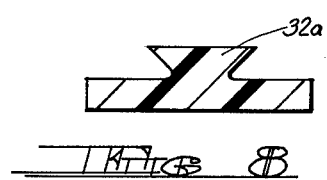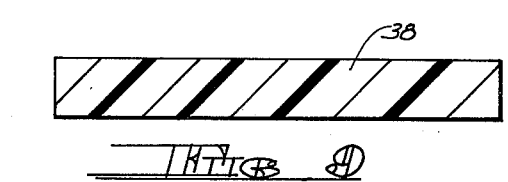

SLIDE GATE SEALING CLOSURE

BACKGROUND OF THE INVENTION

1. Field of the Invention

The present invention relates to fluid control apparatus, and more particular to slide gates and sealing means therefor.

2. Description of the Prior Art

Slide gates are used extensively as a means of fluid control and have particular utility in applications where it is necessary to control large volumes of fluid. The effectiveness of slide gates is dependent in large measure upon the continuing efficiency of the sealing means between the slide gate and the face of the stationary frame structure with which the gate cooperates to form a substantially watertight seal.

In accordance with conventional practice, a series of wedges is generally installed about the perimeter of the slide gate to force the slide gate tightly against the stationary frame. The machined mating surfaces are usually constructed from brass or similar non-corrosive, long wearing metallic substance. In four-sided gates of rectangular construction with which the present invention is primarily concerned, such wedges at the top face and the two side faces cooperate adequately to form a reasonably watertight seal. However, the seal depends upon a tight frictional fit between a gasket, which is attached to the gate, and the stationary gate frame. Accordingly, frictional wear occurs whenever the gate is opened or closed. This frictional wear is greatly accelerated if the fluid contains any abrasive material. Additionally, since conventional gates depend on a tight frictional fit for a good seal, dimensional tolerances during manufacture are restricted.

SUMMARY OF THE INVENTION

In contrast, the slide gate sealing closure of the present invention overcomes the aforementioned disadvantages. According to the present invention the slide gate sealing closure is utilized in a slide gate of the type having a frame with a sill and an opening for the passage of a fluid, and a gate slidably mounted on the frame for movement toward and away from the sill between open and closed positions. A first flange is provided projecting from the frame on both sides of the opening. A resilient seal member is fixed to the first flange. A second flange substantially identical to the first flange projects from the back side of the gate. The first and second flanges are so positioned that, when the gate is in the closed position against the sill, the first and second flanges overlap and the resilient sealing member is compressed so as to produce a watertight seal, whereby sealing is accomplished by a compression of the resilient sealing member between the first and second flanges when the gate is substantially closed, thus virtually eliminating frictionally wear of the resilient sealing member.

BRIEF DESCRIPTION OF THE DRAWING

FIG. 1 is a front elevational view of a slide gate incorporating the slide gate sealing closure of the present invention, wherein the slide gate is in the closed position.

FIG. 2 is a front elevational view similar to FIG. 1 wherein the slide gate is in the open position.

FIG. 3 is a plan view of the stationary frame of the slide gate of FIGS. 1 and 2 with the slide gate removed.

FIG. 4 is an enlarged cross-sectional view taken on the line 4—4 of FIG. 1.

FIG. 5 is an enlarged cross-sectional view taken on the line 5—5 of FIG. 1.

FIG. 6 is an enlarged cross-sectional view taken on the line 6—6 of FIG. 1.

FIG. 7 is an enlarged cross-sectional view taken on the line 7—7 of FIG. 1.

FIGS. 8 and 9 are cross sectional views showing the configuration of preferred sealing members.

DESCRIPTION OF THE PREFERRED EMBODIMENT

Turning now to FIGS. 1 and 2, it will be seen that the slide gate assembly 10 herein described and illustrated by way of example consists essentially of a flat frame 12, opposite side guides 14 and 16, the slidable gate 18 and the sealing structure for effecting a substantial fluid tight seal between the gate 18 and the frame 12.

The frame 12 which, as illustrated in preferably rectangular in shape, is provided with a central opening 20 of the same configuration as the cross-section of the conduit, canal or the like in which the gate assembly 10 is installed. In the illustrated embodiment of the invention, the central opening 20 is of rectangular shape. However, it will, of course, be understood that where the gate assembly 10 is installed in a circular conduit, the frame 12 is preferably square with its sides tangent to the conduit walls, and is provided on its back side with a circular opening.

The frame 12 is adapted to be rigidly secured to a structural support assembly 22 which is ordinarily formed integrally with the canal or other fluid conduit to which the slide gate assembly 10 is applied. The frame 12 is preferably positioned so that the lower edge of the opening 20 is substantially flush with the bottom of the canal or conduit over its full length in the case of a rectangular conduit or at the point of tangency in the case of a circular conduit, to form a sill 24.

The side guides 14 and 16, which are rigidly secured to the frame 12 at its opposite longitudinal edges by means of the bolts 26, are each provided with a groove 28, as best seen in FIGS. 3, 5 and 6, extending the full length thereof, which provides a guiding surface for the ends 18a of the gate slide 18.

Means (not shown) are provided for moving the gate slide 18 in the side guides 14 and 16 toward and away from the sill 24 between open and closed positions.

The sealing structure for effecting a substantial fluid tight seal between the gate slide 18 and the frame 12 comprises a first flange 30 projecting from the frame 12 on both sides of, and if desired above, the opening 20. Whether or not the first flange 30 projects from the frame 12 above the opening 20 depends, of course, upon whether or not the gate assembly is being utilized for applications wherein it is not submerged, such as, for example, irrigation ditches. A resilient sealing member 32 is fixed to the first flange 30. A second flange 34 substantially identical to the first flange 30 projects from the back side of the gate 18. The first and second flanges 30 and 34 are so positioned that, when the gate slide 18 is in the closed position against the sill 24, the first and second flanges 30 and 34 overlap and the resilient sealing member 32 is compressed so as to produce a watertight seal. Sealing is thereby accomplished by a compression of the resilient sealing member 32 between the first and second flanges 30 and 34 when the gate slide 18 is substantially closed, thus virtually eliminating frictional wear of the resilient sealing member 32.

In a preferred embodiment, the configuration of the resilient sealing member 32 is trapezoidal, as best seen at 32a in FIG. 8. This shape results in better water tightness when high static pressure heads are present because of more flexibility in the "tips" of the trapezoidal base portion.

The first and second flanges 30 and 34 are inclined, resulting in engagement and compression of the resilient sealing member 32 as the gate slide 18 approaches its closed position. In practice it has been found that the side portions of the first flange 30 are preferably slanted outwardly at approximately ⅜ inch per foot of vertical opening 20.

Additionally, in a preferred embodiment the top projection 30a of the first flange 30 is curved on its full width, meeting the side projections 30b of the first flange 30 with rounded corners 30c. This permits installation of the resilient sealing member 32 as a one-piece unit on both sides and on the top. It will, of course, be understood that the corners 30c between the top projection 30a and the side projections 30b need not be rounded, but may be of any configuration whereby the sealing member 32 will assume such a configuration to affect a good seal. Additionally, the curvature of the top projection 30a of the first flange 30 permits installation of anchor bolts 36 between it and the top of the opening 20.

The second flange 34 is of the same shape and form as assumed by sealing member 32 when fixed to the first flange 30 except that it is ⅛ of an inch closed in. Accordingly, when the gate slide 18 is lowered, the first and second flanges 30 and 34 only start to compress the resilient sealing member 32 when the gate is substantially closed, which it has been found is when the gate has about 2 inches left to be in the fully closed position.

A resilient sealing member 38 is provided on the sill 24 so that when the sides of the gate slide 18 meet at the sill 24, the resilient sealing member 38 suchions the underside of the gate slide 18 when the gate slide 18 is in the fully closed position. It has been found that best results are obtained when the sealing member 38 is rectangular in shape as shown in FIG. 9.

It will, of course, be understood that the resilient sealing members 32 and 38 may comprise any suitable sealing material such as rubber and the like.

The slide gate assembly 10 incorporating the closure seal structure of the present invention provides the necessary watertightness without the use of prior art wedging devices normally used in fluid control gate construction, which utilized rubber seals usually depending on a tight frictional fit between a gasket, which is attached to the gate, and a gate frame. However, according to the closed seal structure of the present invention, the sealing is accomplished not by friction but by compression of the resilient sealing member 32 between the first and second flanges 30 and 34 of the frame 12 and gate slide 18, respectfully, which occurs when the gate slide 18 is substantially closed. This virtually eliminates frictional wear (which is greatly accelerated if the fluid contains any abrasive material) on the resilient seal member 32 whenever the gate is opened or closed.

It should also be noted that since conventional gates depend on a tight frictional fit for a good seal, dimensional tolerances during manufacture are more restricted. This is not the case with slide gate assemblies incorporating the closure seal structure of the present invention.

Of further interest is the fact that high static pressure heads of fluid aid in more efficiently sealing in slide gate assemblies incorporating the closure seal structure of the present invention because the lip of the resilient sealing member 32 is compressed.

The closure seal structure of the present invention gives rise to many advantages and to versatility of application, including:

1. The gate is simple to fabricate; it can be made of structural steel, stainless steel, aluminum or cast iron, and can be designed structurally and sold for seating or unseating heads.

2. The gate can withstand some distorted installation without increasing leakage where conventional gates cannot.

3. The gate can be used as standard or flush bottom without modification.

4. Fabrication requires no machining except possibly for the guide bars and sides and bottom of slide, if they are made of cast iron.

5. Should the resilient sealing member need to be changed, which is very unlikely, it is easily accessible.

6. The gate is available as rising stem, non-rising or self-contained.

7. When the pressures are unseating the gate when in the closed position, the friction factor resistance for opening the gate is reduced because the pressure pushes under the horizontal seal at the top and on the sides of the slide, tending upward lift.

8. The gate may be used under high static head conditions since stiffness may be incorporated into the slide so as to provide for adequate structural strength in the slide.

9. Since the slide does not overlap the bottom sill of the gate frame, the gate may be utilized without modification, where either a flush bottom or a standard closure gate is required.

While in many applications, such as fluid carrying abrasive suspended mattress, the closure seal structure of the present invention would not be affected as would a conventional gate with bronze seating faces and wedging devices, gate assemblies incorporating the closure seal structure should preferably not be used where large solid pieces of floating objects can be wedged between the first and second flanges 30 and 34, since this could cause permanent damage to the sealing effect. However, the applications for gate assemblies incorporating the closure seal structure of the present invention are myriad and include water filtration plants, sewage treatment plants (installed in basins where solids have been removed), treated sewage outfall waters, pumping stations, water intakes, irrigation, spillways, and any other application where the resilient sealing members will not disintegrate with certain acid effluents.

I claim:

1. In a gate assembly of the type having a frame with a sill and an opening for the passage of a fluid, and a gate slide mounted on said frame for movement toward and away from said sill, between open and closed positions, the improvement, in combination therewith, comprising a first flange projecting from said frame on both sides of said opening, a resilient sealing member fixed to said first flange, and a second flange substantially identical to said first flange projecting from the back side of said gate slide, said first and second flanges being so positioned that, when said gate slide is in the closed position against said sill, said first and second flanges overlap and said resilient sealing member is compressed so as to produce a water tight seal, whereby sealing is accomplished by a compression of said resilient sealing member between said first and second flanges when said gate slide is substantially closed, thus virtually eliminating frictional wear of said resilient sealing member.

2. The gate assembly according to claim 1, wherein said first and second flanges are inclined, resulting in engagement and compression of said resilient sealing member as said gate slide approaches its closed position.

3. The gate assembly according to claim 1, wherein the side portions of said first flange are slanted outwardly at approximately ⅜ inch per foot of vertical opening.

4. The gate assembly according to claim 1, wherein said first flange projects from said frame above said opening.

5. The gate assembly according to claim 4, wherein said first flange above said opening is curved on its full width, and wherein said resilient seal is one piece on both side projections and top projection.

6. The gate assembly according to claim 5, wherein said first flange above said openings meets the side projections of said first flange with rounded corners.

7. The gate assembly according to claim 1, wherein said second flange is of the same shape and form as said sealing member fixed to said first flange except that it is ⅛ of an inch closed in, whereby when said gate slide is lowered said first and second flanges only start to compress said resilient sealing member when said gate slide is substantially closed.

8. The gate assembly according to claim 1, wherein a resilient sealing member is provided on said sill so that when the sides of said gate slide meet at said sill, said resilient sealing member suchions the underside of said gate slide when said gate slide is in the fully closed position.

9. The gate assembly according to claim 1, wherein the configuration of said resilient sealing member is trapezoidal.

* * * * *